UNITED STATES PATENT OFFICE.

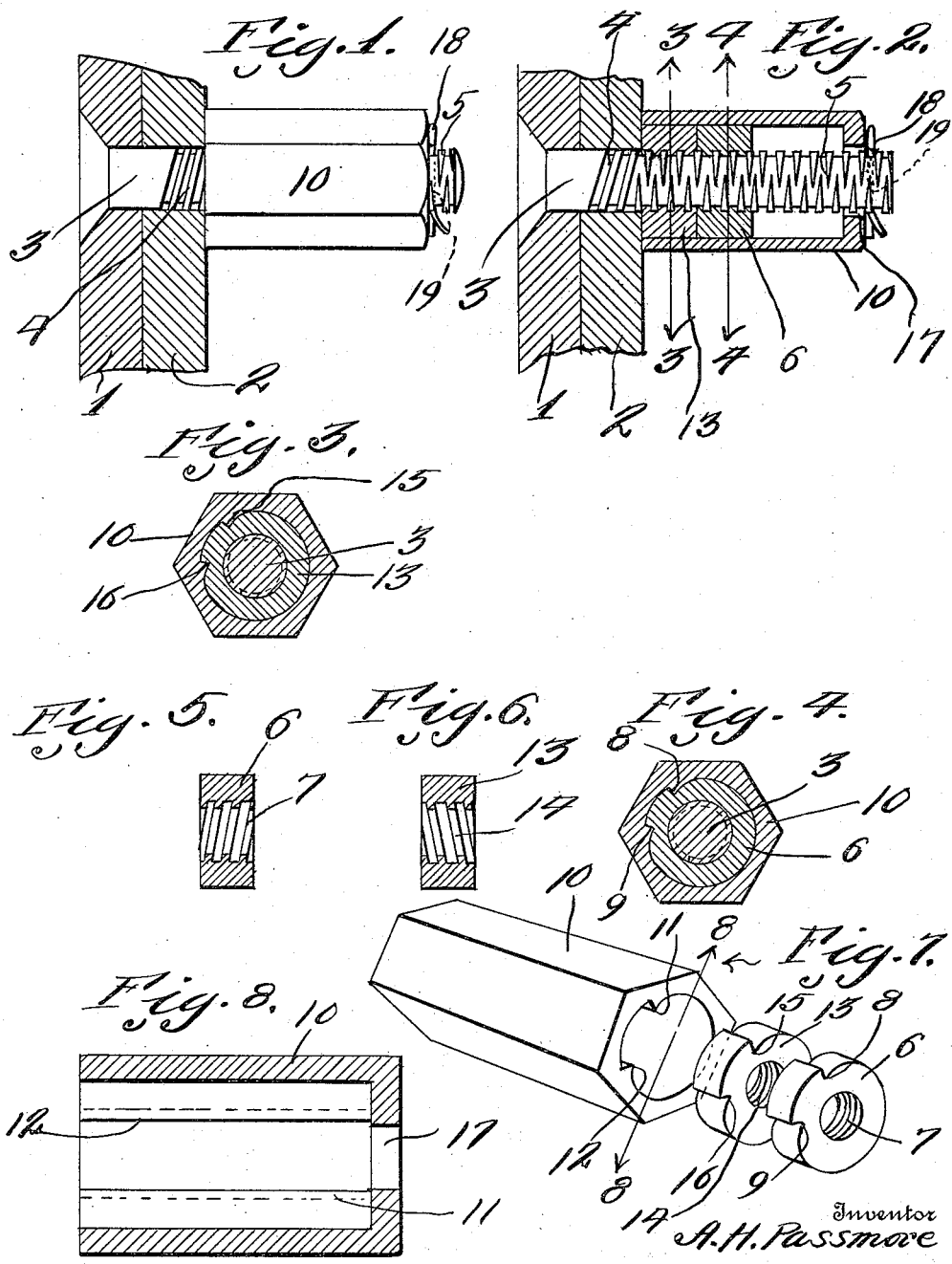

AUGUSTUS HANSELL PASSMORE, OF ST. PETERSBURG, FLORIDA.

NUT-LOCK.

1,174,759. Specification of Letters Patent. Patented Mar. 7, 1916.

Application filed June 30, 1915. Serial No. 37,312.

*To all whom it may concern:*

Be it known that I, AUGUSTUS HANSELL PASSMORE, a citizen of the United States, residing at St. Petersburg, in the county of Pinellas and State of Florida, have invented a new and useful Nut-Lock; and I do hereby declare the following to be a full, clear, and exact description of the invention, such as will enable others skilled in the art to which it appertains to make and use the same.

This invention relates to an improved nut lock and cover therefor, and an object of the invention is to provide a device of this nature comprising simple, efficient and practical features of construction.

One of the features of construction is the provision of a right and left threaded bolt having a pair of nuts, one being provided with an interior right hand thread, the other with an interior left hand thread, to engage the thread of the bolt, said nuts having notches, to receive projections or elongated ribs on the interior of a sleeve wrench, whereby the nut may be screwed home, that is, one at a time, and when the second nut is screwed home, the sleeve wrench is allowed to remain in engagement with the nut acting as a shield or protector for the same, there being a cotter pin passing transversely of the bolt to hold the sleeve wrench in place.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation and partly in section, showing the application of the nut lock constructed in accordance with the invention. Fig. 2 is a sectional view through the nut. Fig. 3 is a sectional view on line 3—3 of Fig. 2. Fig. 4 is a sectional view on line 4—4 of Fig. 2. Fig. 5 is a detail sectional view of one of the nuts. Fig. 6 is a detail sectional view of the other nut. Fig. 7 illustrates collective views in perspective of the parts of the nut lock disassembled. Fig. 8 is a sectional view on line 8—8 of one of the parts in Fig. 7.

Referring to the drawing 1 and 2 designate two pieces to be clamped together, whereas 3 denotes a bolt, the shank of which is provided with right and left threads 4 and 5. The bolt 3 is first passed through the two pieces 1 and 2, then the nut 6 (which is provided with right threads 7) is screwed upon the shank of the bolt. The nut 6 has notches 8 and 9 of the shape shown in its outer circumference, whereas the sleeved wrench and cover 10 is provided upon its inner circumference with elongated ribs 11 and 12 (which correspond in shape to the notches 8 and 9) to enter the notches 8 and 9 of the nut 6. The sleeve wrench has its outer circumference shaped hexagonal so that an ordinary wrench may be used thereon. The nut 6 with its right hand thread is started on the shank by hand, then the sleeve wrench is applied to the nut 6 and an ordinary nut wrench applied to the sleeve wrench, so that the sleeve wrench may be turned, thereby imparting a revoluble movement to the nut 6, causing the same to thread upon the shank on the right hand thread thereof until it reaches home. Then a second nut 13 having left hand threads 14 is started upon the shank by hand so as to engage the left hand threads of the shank of the bolt. The second nut 13 is also provided with notches 15 and 16 similar to the notches 8 and 9 of the nut 6, to receive the elongated ribs 11 and 12 of the sleeve wrench 10. After the sleeve wrench 10 has been applied to the second nut, the sleeve wrench is rotated in the same manner as when applying the nut 6, but in the opposite direction, until the second nut is screwed home upon the left hand thread and in contact with the first nut, and until the notches of the second nut register with the notches of the first nut, then the sleeve wrench is moved axially toward the piece 2, so that the ribs 11 and 12 will enter the notches 8 and 9 of the first nut, in which case the end of the bolt shank will pass through the opening 17 of the end wall of the sleeve wrench, after which a cotter pin 18 is passed through an aperture or opening 19 of the end of the shank, thereby holding the sleeve wrench in place, and which will then constitute a cover or protector, as well as preventing the nuts from unscrewing.

The invention having been set forth, what is claimed as new and useful is:—

In combination with a uniform cylindrical bolt shank having right and left intersecting threads, a pair of circular nuts to engage the shank, one having right hand threads to coöperate with the right hand threads of the shank, the other having left hand threads to coöperate with the left hand threads of the shank, each of said nuts having adjacent V-shaped notches substantially inclined toward one another forming a dovetailed tongue, a hollow sleeve wrench having on its interior surface a pair of elongated V-shaped ribs spaced apart and in parallelism, to form an elongated dovetailed groove, to receive the dove-tailed tongues, while the ribs engage said notches, whereby the nuts may be turned home on the shank one at a time, said hollow sleeve wrench having an opening in one end through which one end of the shank extends, said wrench sleeve constituting a protecting shell for the threads, and means to prevent the nuts from turning, and a device engaging the free end of the shank to hold the sleeve upon the shank and the nut.

In testimony whereof I have signed my name to this specification in the presence of two subscribing witnesses.

AUGUSTUS HANSELL PASSMORE.

Witnesses:
H. D. RODD,
WM. H. HEINEY.

Copies of this patent may be obtained for five cents each, by addressing the "Commissioner of Patents, Washington, D. C."